(12) United States Patent
Snyder et al.

(10) Patent No.: US 11,772,628 B2
(45) Date of Patent: Oct. 3, 2023

(54) METHOD AND SYSTEM FOR KINETIC ENERGY RECOVERY IN A HYBRID POWERTRAIN DURING ENGINE SHUTDOWN

(71) Applicant: Cummins Inc., Columbus, IN (US)

(72) Inventors: David B. Snyder, Greenwood, IN (US); Ming-Feng Hsieh, Nashville, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 17/677,833

(22) Filed: Feb. 22, 2022

(65) Prior Publication Data

US 2022/0281432 A1 Sep. 8, 2022

Related U.S. Application Data

(60) Provisional application No. 63/158,075, filed on Mar. 8, 2021.

(51) Int. Cl.
*B60W 10/06* (2006.01)
*B60W 10/08* (2006.01)
(Continued)

(52) U.S. Cl.
CPC .............. *B60W 10/06* (2013.01); *B60K 6/48* (2013.01); *B60W 10/026* (2013.01);
(Continued)

(58) Field of Classification Search
CPC ...... B60W 10/06; B60W 10/08; B60W 10/02; B60W 10/026; B60W 10/11; B60W 20/40;
(Continued)

(56) References Cited

U.S. PATENT DOCUMENTS 8,690,259 B2 4/2014 Hagenbuch
10,399,432 B2 9/2019 Kesani
(Continued)

FOREIGN PATENT DOCUMENTS

CN 110103943 A * 8/2019 ............ B60W 10/06
FR 3020028 A1 * 10/2015 ............ B60K 6/387
(Continued)

OTHER PUBLICATIONS

JP2018131158 machine translation pp. 1-8 filed Feb. 25, 2023. (Year: 2023).*

(Continued)

*Primary Examiner* — Tisha D Lewis
(74) *Attorney, Agent, or Firm* — Faegre Drinker Biddle & Reath LLP

(57) ABSTRACT

Examples of hybrid powertrain systems are provided herein. The system includes: an engine; a motor/generator ("MG"); a clutch coupled to the engine and the MG; a transmission coupled to the MG; an energy storage system connected to the MG; and a controller coupled to the engine, the MG, the clutch, the transmission and the energy storage system. The controller is configured to initiate an engine stop, allow engine torque and MG torque to reduce to zero or near zero, shift the transmission to a neutral gear, cause the MG to operate in a generator mode, thereby loading the engine to recover kinetic energy from the engine, disengage the clutch to decouple the MG from the engine, increase the speed of the MG to a target speed, and shift the transmission into gear in response to the MG reaching the target speed.

20 Claims, 5 Drawing Sheets

(51) Int. Cl.
*B60W 10/02* (2006.01)
*B60W 20/40* (2016.01)
*B60K 6/48* (2007.10)

(52) U.S. Cl.
CPC ..... *B60W 10/08* (2013.01); *B60W 2510/0657* (2013.01); *B60W 2710/024* (2013.01)

(58) Field of Classification Search
CPC ... B60W 2510/0657; B60W 2710/024; B60W 2710/021; B60W 2710/081; B60W 2710/1005; B60K 6/48; B60K 2006/4825
See application file for complete search history.

(56) References Cited

U.S. PATENT DOCUMENTS

| | | | | |
|---|---|---|---|---|
| 2010/0286858 | A1* | 11/2010 | Otokawa | B60K 6/365 180/65.21 |
| 2015/0329103 | A1* | 11/2015 | Kim | B60W 20/40 180/65.265 |
| 2018/0354499 | A1* | 12/2018 | Park | B60W 20/50 |

FOREIGN PATENT DOCUMENTS

| | | | | |
|---|---|---|---|---|
| JP | 2012183900 | A | | 9/2012 |
| JP | 2012201227 | A | | 10/2012 |
| JP | 2018131158 | A | * | 8/2018 ............ B60W 10/10 |

OTHER PUBLICATIONS

FR3020028 machine translation pp. 1-10 filed Feb. 24, 2023. (Year: 2023).*

* cited by examiner

METHOD AND SYSTEM FOR KINETIC ENERGY RECOVERY IN A HYBRID POWERTRAIN DURING ENGINE SHUTDOWN

CROSS-REFERENCE TO RELATED APPLICATION

This application claims priority to U.S. Provisional Application No. 63/158,075, filed on Mar. 8, 2021, the disclosure of which is hereby incorporated herein by reference in its entirety.

FIELD

Disclosed embodiments relate generally to hybrid powertrain control and more particularly to methods and systems for recovering energy from an internal combustion engine during shutdown to improve the overall efficiency of the hybrid powertrain.

BACKGROUND

Hybrid vehicles generally include an internal combustion engine and at least, one motor/generator ("MG"). Many hybrid vehicles use an engine start/stop feature in which a vehicle controller shuts down the internal combustion engine under certain circumstances (e.g., when the vehicle is at zero speed, such as at a stop light) to consume less fuel and reduce emissions. While such engine shutdowns reduce energy consumption in terms of fuel, restarting the engine after the shutdown consumes energy. In some vehicles, a small electric starter is used to restart the engine, but that approach is inefficient from an energy consumption standpoint, especially when the powertrain includes a large internal combustion engine and shutdowns occur frequently. Other restart approaches include closing the clutch while the vehicle is at speed under power of the MG (similar to "bump starting" the vehicle), but this approach slows the vehicle, loses energy as a result of clutch slippage and affects drivability.

Alternatively, the MG of the powertrain may be used to restart the engine. Full hybrid vehicles (also known as "strong" hybrids) have relatively large MGs which can propel the vehicle without use of the engine. During engine restart, the transmission could be placed in neutral to disconnect the MG from the final drive, making the MG available for restarting the engine. Then, the MG speed could, be decreased to zero and the clutch between the MG and engine could be closed, thereby resulting in nearly zero energy loss due to clutch slippage. The engine could then be started with the MG. This approach also results in undesirable energy consumption. As such, it is clear that further improvements in energy efficiency for hybrid vehicles using start/stop technology is needed.

SUMMARY

In one embodiment, the present disclosure provides a hybrid powertrain system, comprising: an engine; at least one motor/generator ("MG"); a clutch coupled to the engine and the at least one MG; a transmission coupled to the at least one MG; an energy storage system connected to the at least one MG; and a controller operatively coupled to the engine, the at least one MG, the clutch, the transmission and the energy storage system, the controller including a processor and a memory including instructions that when executed by the processor, cause the controller to initiate an engine stop, allow engine torque and torque associated with the at least one MG to reduce to zero or near zero, shift the transmission to a neutral gear, cause the at least one MG to operate in a generator mode, thereby loading the engine through the clutch to recover kinetic energy from the engine, disengage the clutch to decouple the at least one MG from the engine, increase a speed of the at least one MG to a target speed, and shift the transmission into gear in response to the at least one MG reaching the target speed. In one aspect of the disclosure, execution of the instructions by the processor further causes the controller to propel a vehicle using power from the at least one MG after shifting the transmission into gear. In a variant of this aspect, the vehicle is a full hybrid vehicle. In another variant, the engine is an internal combustion engine. In another variant of this aspect, initiating an engine stop includes determining based upon input from at least one sensor that power from the engine is not required to propel the vehicle. In another variant, shifting the transmission to a neutral gear decouples the at least on MG from a final drive of the vehicle. In another aspect of this embodiment, execution of the instructions by the processor further causes the controller to control the at least one MG to store energy recovered from the engine by the at least one MG in the energy storage system. In yet another aspect, the energy storage system includes a plurality of batteries.

In another embodiment, the present disclosure provides a method for recovering energy from an engine in a hybrid powertrain including at least one motor/generator ("MG"), comprising: initiating an engine stop; allowing engine torque and torque associated with the at least one MG to reduce to zero or near zero; shifting a transmission coupled to the at least one MG to a neutral gear; causing the at least one MG to operate in a generator mode, thereby loading the engine through a clutch to recover kinetic energy from the engine; disengaging the clutch to decouple the at least one MG from the engine; increasing a speed of the at least one MG to a target speed; and shifting the transmission into gear in response to the at least one MG reaching the target speed. One aspect of this embodiment further comprises propelling a vehicle using power from the at least one MG after shifting the transmission into gear, in a variant of this aspect, the vehicle is a full hybrid vehicle. In another variant, the engine is an internal combustion engine. In yet another variant, initiating an engine stop includes determining based upon input from at least one sensor that power from the engine is not required to propel the vehicle. In still a further variant, shifting a transmission to a neutral gear decouples the at least on MG from a final drive of the vehicle. Another aspect of this embodiment further comprises storing energy recovered from the engine by the at least one MG in an energy storage system connected to the at least on MG. In another aspect, the energy storage system includes a plurality of batteries.

In, still another embodiment, the present disclosure provides a hybrid powertrain system, comprising: an engine; at least one motor/generator ("MG"); a first clutch coupled to the engine and the at least one MG; a second clutch coupled between the at least one MG and a final drive; an energy storage system connected to the at least one MG; and a controller operatively coupled to the engine, the at least one MG, the first clutch, the second clutch and the energy storage system, the controller including a processor and a memory including instructions that when executed by the processor, cause the controller to initiate an engine stop, allow engine torque and torque associated with the at least one MG to reduce to zero or near zero, open the second clutch, cause the at least one MG to operate in a generator mode, thereby loading the engine through the first clutch to recover kinetic energy from the engine, disengage the first clutch to decouple the at least one MG from the engine, increase a speed of the at least one MG to a target speed, and close the second clutch in response to the at least one MG reaching the target speed.

It should be appreciated that in various embodiments the foregoing concepts, and additional concepts discussed below, may be arranged in any suitable combination. Further, other advantages and novel features of the present disclosure will become apparent from the following detailed description of various non-limiting embodiments when considered in conjunction with the accompanying figures.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
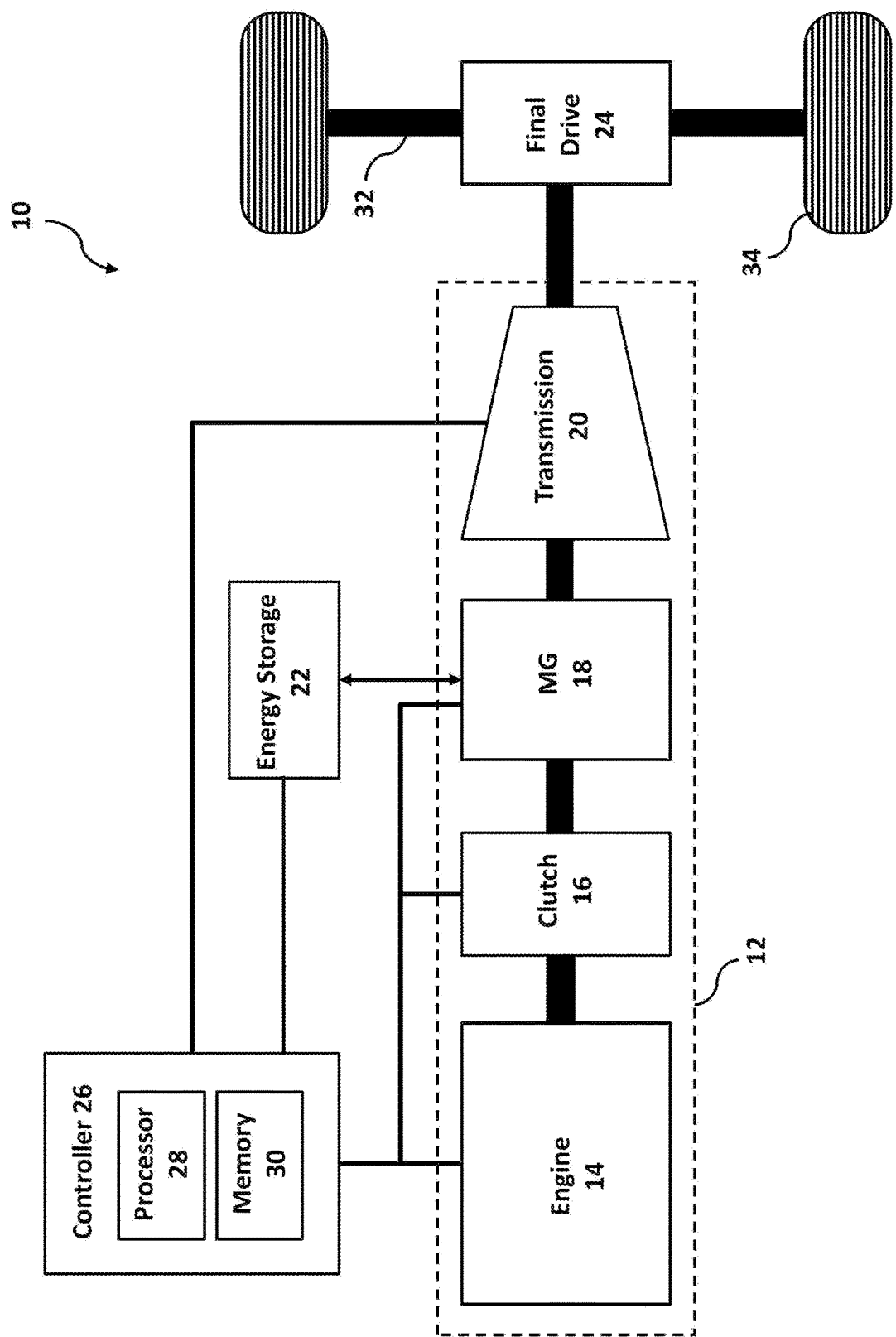
FIG. 1 is a high-level conceptual block diagram of a hybrid powertrain for a vehicle.

Referring now to FIG. 1, a conceptual block diagram of a hybrid vehicle 10 is shown including a powertrain 12 having an internal combustion engine 14, a clutch 16, an electric machine (hereinafter referred to as a motor/generator (MG 18)), and a transmission 20. Vehicle 10 further includes an energy storage system 22, a final drive 24 and a controller 26, including a processor 28 and a memory 30. Powertrain 12 may include other components and is only depicted as shown to describe the operation of the technology of the present disclosure. For example, powertrain 12 may include additional clutches 16 and/or additional MGs 18. Moreover, vehicle 10 may be configured as a mild hybrid, a full hybrid or a plug-in hybrid. Additionally, while the description herein contemplates use of powertrain 12, the teachings of the present disclosure may be used in other applications such as in a hydraulic hybrid powertrain. Finally, the teachings of the present disclosure may have application to powertrains for equipment other than vehicles.

Internal combustion engine 14 is mechanically coupled to MG 18 by clutch 16. Engine 14 may be any type of combustion engine including, but not limited to spark-ignited engines or compression-ignited engines of any configuration, size and/or fuel type.

MG 18 is further mechanically coupled to transmission 20, which in turn is mechanically coupled to final drive 24 which contains a differential that mechanically couples to a drive shaft 32 connecting two or more wheels 34 together.

MG 18 is electrically coupled to energy storage system 22 to receive electrical power from energy storage system 22 and to deliver electrical power to energy storage system 22. Energy storage system 22 in some examples includes, but is not limited to, batteries such as lithium-ion, nickel-metal hydride, or lead-acid batteries. Energy storage system 22 may alternatively include ultracapacitors or other types of energy storage devices. In FIG. 1, thick lines represent mechanical coupling, whereas thin lines represent electrical coupling, for example, via wires or wirelessly.

As indicated above, controller 26 includes a processor 28 and a memory storage device 30. Processor 28 may be any suitable processor such as a central processing unit (CPU), state machines, system-on-chip (SoC), etc. The memory storage device 30 may be any suitable memory such as random access memory (RAM), read-only memory (ROM), flash memory, etc. As shown, controller 26 is electrically coupled to engine 14, clutch 16, MG 18, transmission 20, and energy storage device 22, such that controller 26 may detect any input from these components as well as send operation signals to control the operation of these components.

In some examples, the components that are electrically coupled with controller 26 have one or more sensors (not shown) coupled thereto that take measurements which indicate the present status of the component, such as a state-of-charge (SOC) of energy storage device 22, the temperature of engine 14 and/or its aftertreatment system (not shown), the on/off status of clutch 16, among others. In some examples, such data is stored in memory storage device 30 of controller 26 such that controller 26 may use the stored data at any time without having to take new measurement when needed. In some examples, the data in memory storage device 30 is updated frequently at a constant rate, i.e., new measurements are taken at predetermined intervals, such that "freshness" of the data is maintained. Controller 26 in some examples has instructions, e.g., computing algorithms, stored in memory storage device 30 which processor 28 uses to perform the control process as disclosed herein.

Controller 26 may form a portion of a processing subsystem including one or more computing devices having non-transient computer readable storage media, processors or processing circuits, and communication hardware. Controller 26 may be a single device or a distributed device, and the functions of the controller may be performed by hardware and/or by processing instructions stored on non-transient machine-readable storage media. Example processors include an application specific integrated circuit (ASIC), a field programmable gate array (FPGA), a digital signal processor (DSP), and a microprocessor including firmware. Example non-transient computer readable storage media includes random access memory (RAM), read only memory (ROM), flash memory, hard disk storage, electronically erasable and programmable ROM (EEPROM), electronically programmable ROM (EPROM), magnetic disk storage, and any other medium which can be used to carry or store processing instructions and data structures and which can be accessed by a general purpose or special purpose computer or other processing device.

Certain operations of controller 26 described herein include operations to interpret and/or to determine one or more parameters. Interpreting or determining, as utilized herein, includes receiving values by any method known in the art, including from a datalink, network communication or input device, receiving an electronic signal (e.g. a voltage, frequency, current, or pulse-width-modulation signal) indicative of the value, such as the SOC of energy storage system 22, receiving a computer generated parameter indicative of the value, reading the value from a memory location on a non-transient machine readable storage medium, receiving the value as a run-time parameter by any means known in the art, and/or by receiving a value by which the interpreted parameter can be calculated, and/or by referencing a default value that is interpreted to be the parameter value.

The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosed embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed herein. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of the disclosure, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Returning to FIG. 1, in operation engine 14 may generate power in a known manner which is transferred through clutch 16 and MG 18 to drive operation of transmission 20. Transmission 20 may be shifted into different gears (not shown) to increase or decrease the speed of operation of final drive 24, and therefore the rotation of wheels 34 via drive shaft 32. In a known manner, MG 18 may supply power to transmission 20 in addition to or instead of engine 14 to cause rotation of wheels 34 in the manner described above.

In the depicted embodiment, vehicle 10 includes a start/stop feature implemented by controller 26 to control operation of engine 14. More specifically, when power is not needed from engine 14 to propel vehicle 10, such as when vehicle 10 is stopped or coasting down an incline, controller 26 may cause engine 14 to stop, thereby conserving fuel and reducing emissions. Typically, when engine 14 is stopped in this manner, engine 14 coasts from its current speed to a reduced speed or zero speed as a result of friction. When an engine controller or an operator indicates that torque will be required from engine 14, such as by depressing the accelerator or releasing the brake pedal, engine 14 is restarted using one of a variety of known restart mechanisms. According to the principles of the present disclosure, engine 14 is slowed during shutdown using MG 18 to recovery kinetic energy in the manner described below.

Figure 2:
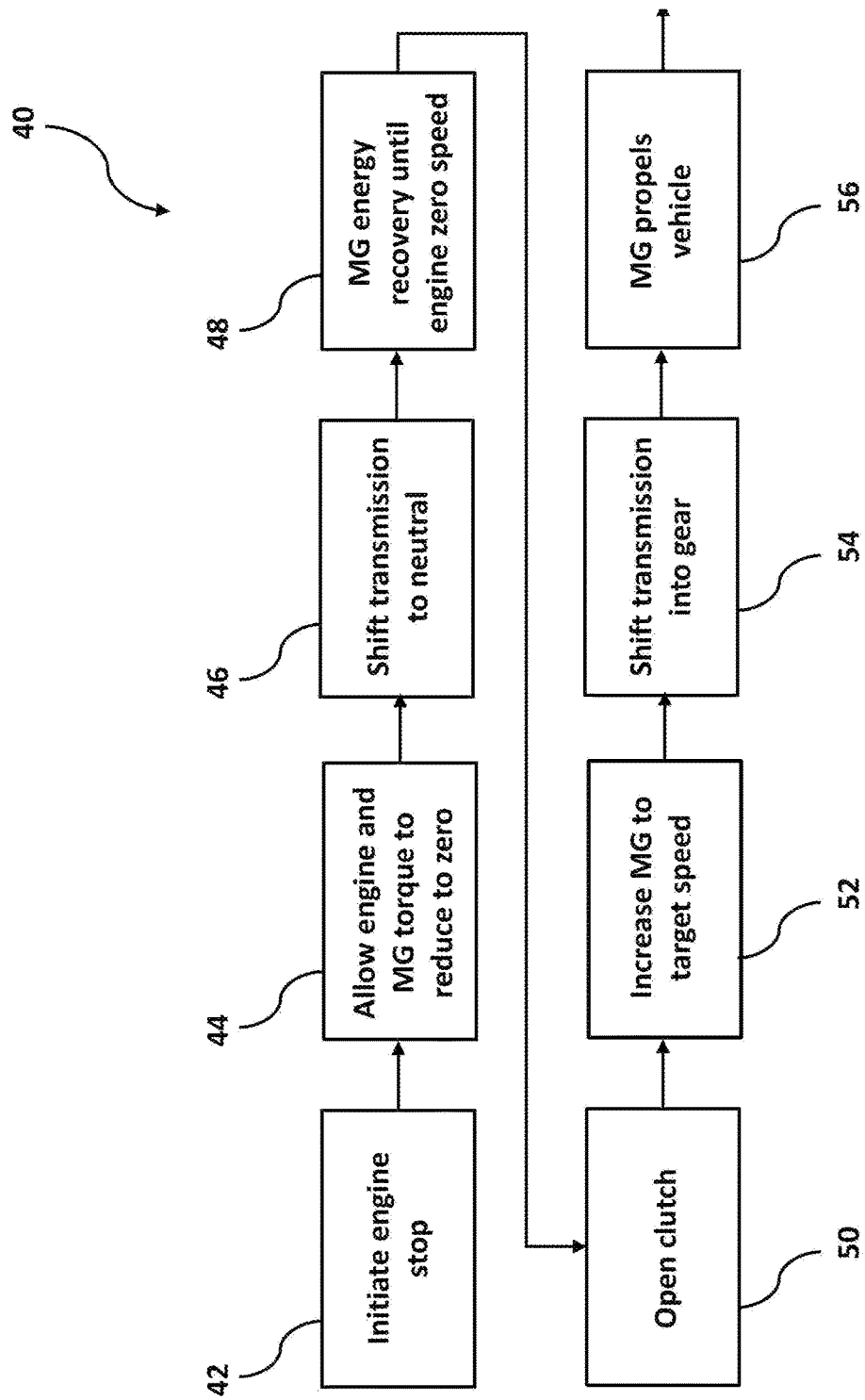
FIG. 2 is a flow chart depicting an engine shutdown and restart process according to the present disclosure.

Referring now to FIG. 2, an exemplary process 40 according to the present disclosure is shown. At step 42, controller 26 initiates an engine stop command such as by processor 28 determining from various sensors that power from engine 14 is not required. As indicated above, this may occur under various circumstances such as when the speed of vehicle 10 is zero or near zero (e.g., at a stop light) or when the torque required from engine 14 is zero or near zero (e.g., when vehicle 10 is coasting down an incline). Regardless of the cause for the engine stop command, controller 26 sends one or more control signals to engine 14 and/or components associated with engine 14 to terminate engine operation. For example, the fuel injection system (not shown) associated with engine 14 may be caused to cease injecting fuel into the engine cylinders.

When engine 14 operation, is terminated at step 42, engine 14 will "coast" briefly to a zero or near zero torque condition. In step 44 of process 40, controller 26 monitors engine 14 and MG 18 (which may also be in motion just before the engine stop command) as engine 14 and MG 18 are allowed to reduce their respective torque outputs to zero or near zero. When both engine 14 and MG 18 are in a zero or near zero torque condition, controller 26 commands transmission 20 to shift to a neutral gear. This decouples MG 18 from final drive 24 to permit MG 18 to be used for energy recovery from engine 14 as described below without directly affecting the speed of vehicle 10. At this point in process 40, engine 14 may still be slowing to a zero or near zero speed. In other words, the internally moving components of engine 14 (e.g., the pistons, crankshaft, etc.) will continue to move for some period of time and, if the stop condition is sufficiently long, will come to a stop as a result of friction and other forces.

After transmission 20 is shifted to neutral (step 46), at step 48 MG 18 is used in a generator mode to load engine 14 and recover the engine's kinetic energy. This additional load on engine 14 causes engine 14 to reach a zero or near-zero speed condition more quickly than if engine 14 were simply allowed to coast to a stop. The energy recovered by MG 18 from engine 14 is provided to energy storage system 22 and stored for future use.

At step 50 of process 40, after engine 14 and MG 18 have slowed to a zero speed or near zero speed condition, controller 26 causes clutch 16 to open. This decouples engine 14 and MG 18 and permits MG 18 to reengage transmission 20. Once decoupled from engine 14 at step 50, MG 18 is commanded at step 52 by controller 26 to accelerate back up to the target speed, which is the speed corresponding to that needed for transmission 20 to shift back into gear. At step 54, controller 26 causes transmission 20 to shift back into gear. It should be understood that the gear into which transmission 20 shifts at step 54 need, not be the same gear out of which transmission 20 shifted in step 46. After this, MG 18 is used to propel vehicle 10 in an all-electric mode as indicated by step 56. MG 18 will continue to be used to propel vehicle 10 until additional torque is required from engine 14 to meet the operator's demands. When additional torque is required, controller 26 causes engine 14 to be restarted in any of a variety of ways known to those skilled in the art.

Figure 3:
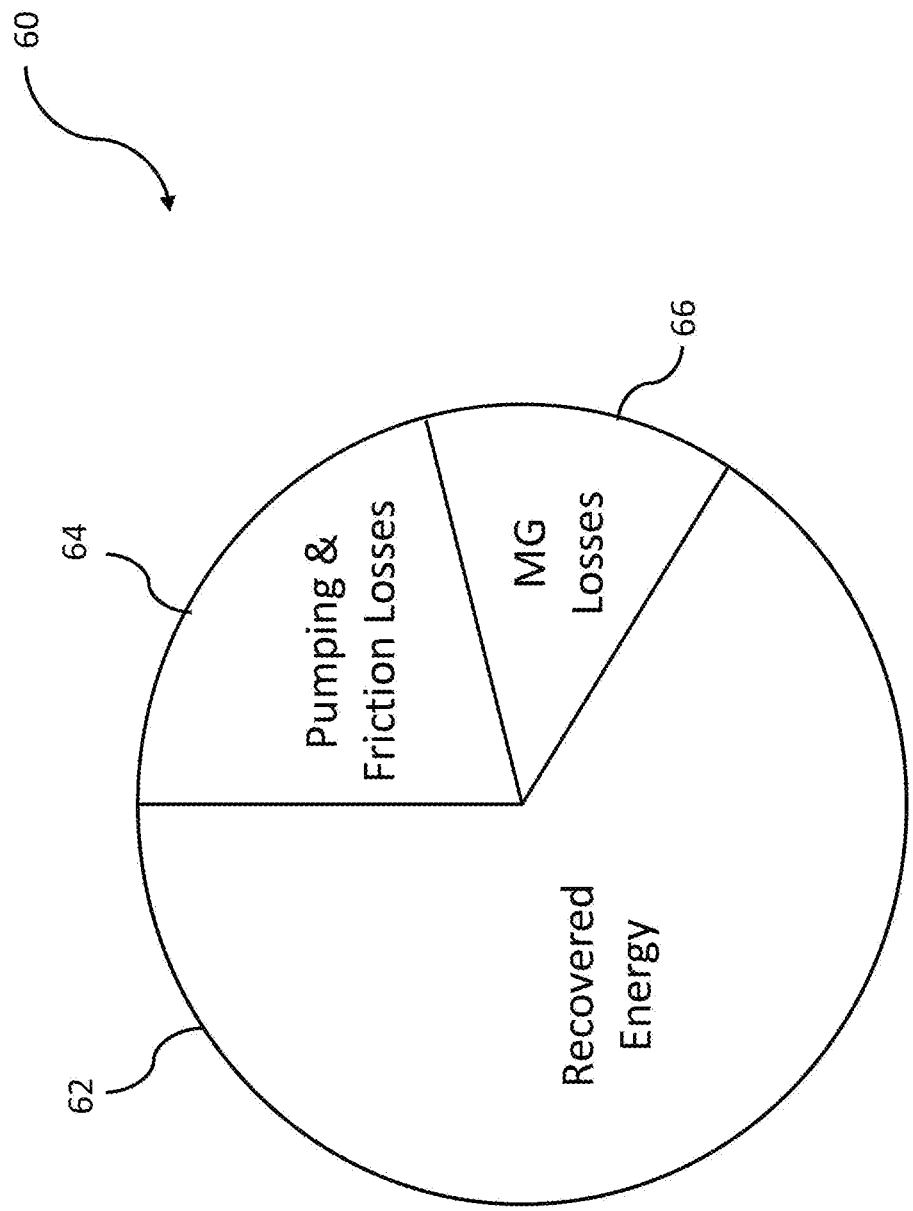
FIG. 3 is a pie chart depicting simulation results of energy recovery and energy loss using a process according to the present disclosure.

Referring now to FIG. 3, simulation results 60 are shown using the principles outlined above. The results were generated on a simulation of a powertrain with a diesel engine and a MG capable of absorbing approximately 700 nm of torque from the engine as the engine slows to a zero speed condition as described above. Prior to shutdown, the engine contained a total of 30.17 kJ of kinetic energy in this example. As shown, through use of the methodology described herein approximately 67% of the kinetic energy of the engine was recovered (see "recovered energy" section 62). The simulation indicated that approximately 21% of the engine's initial kinetic energy was lost due to engine pumping and friction (section 64) and approximately 12% of the kinetic energy was lost due to inefficiencies associated with the MG (section 66).

Figure 4:
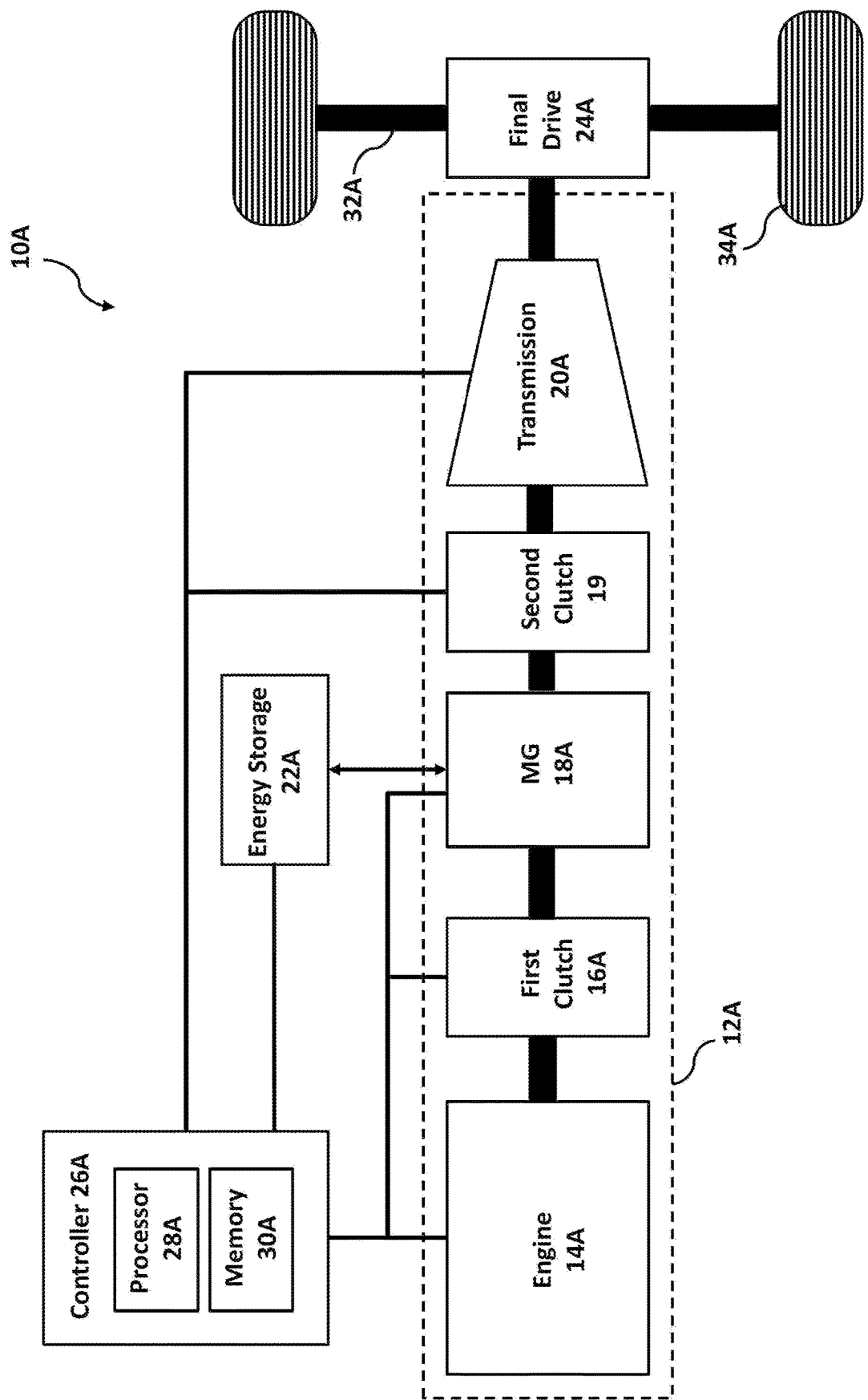
FIG. 4 is a high-level conceptual block diagram of an alternative embodiment of a hybrid powertrain for a vehicle.

Referring now to FIG. 4, an alternative configuration hybrid vehicle 10A is shown including a powertrain 12A having an internal combustion engine 14A, a clutch 16A, a MG 18A, and a second clutch 19. In this embodiment, the transmission 20 is optional. Like vehicle 10 of FIG. 1, vehicle 10A further includes an energy storage system 22A, a final drive 24A and a controller 26A, including a processor 28A and a memory 30A. Powertrain 12A may include other components and is only depicted as shown to describe the operation of the technology of the present disclosure. For example, the powertrain may include additional MGs 18. Moreover, vehicle 10A may be configured as a mild hybrid, a full hybrid or a plug-in hybrid. Additionally, while the description herein contemplates use of powertrain 12A, the teachings of the present disclosure may be used in other applications such as in a hydraulic hybrid powertrain. Finally, the teachings of the present disclosure may have application to powertrains for equipment other than vehicles.

Figure 5:
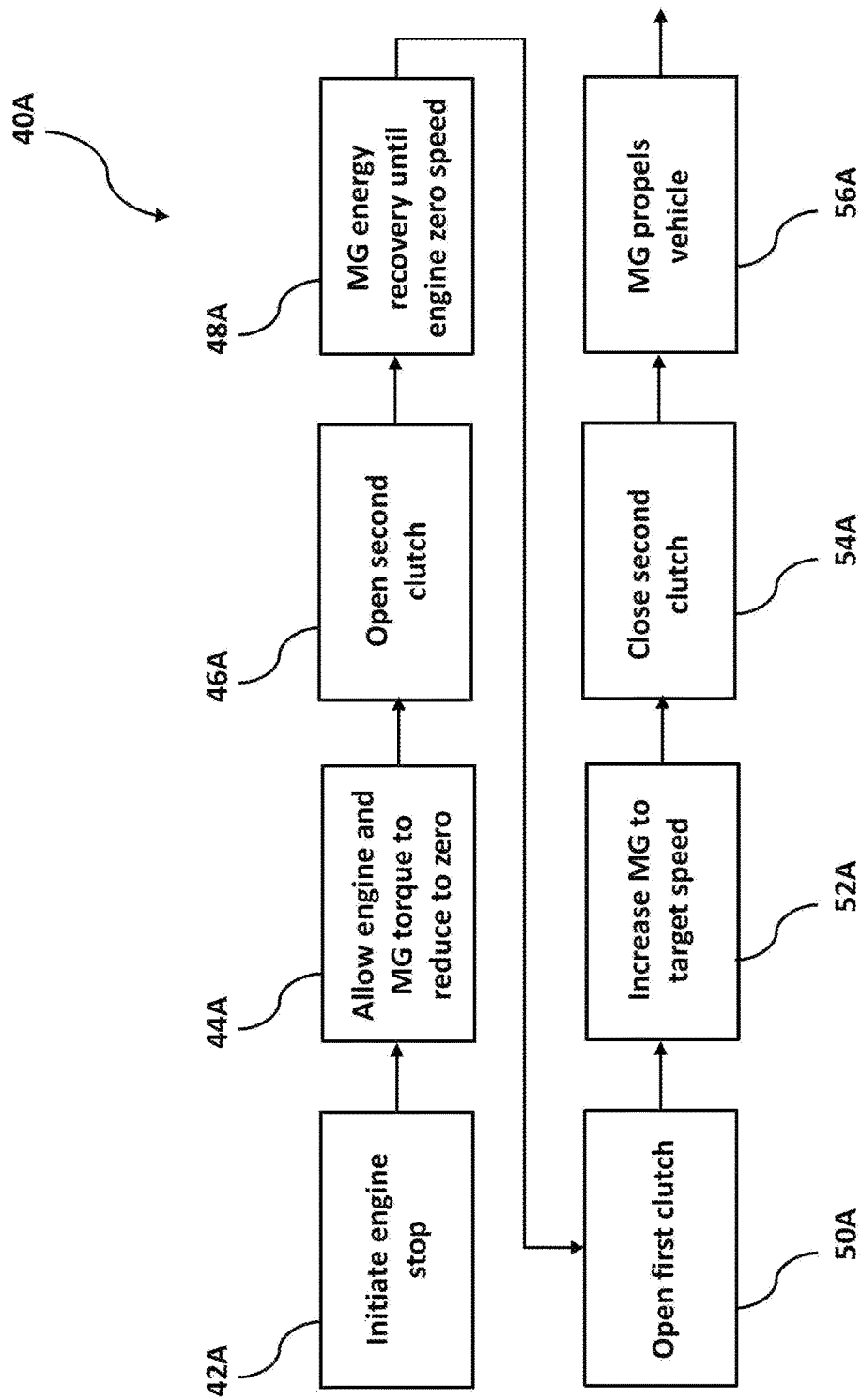
FIG. 5 is a flow chart depicting an alternative embodiment of an engine shutdown and restart process according to the present disclosure.

Referring now to FIG. 5, an exemplary process 40A according to the present disclosure is shown. At step 42A, controller 26A initiates an engine stop command such as by processor 28A determining from various sensors that power from engine 14A is not required. As indicated above, this may occur under various circumstances such as when the speed of vehicle 10A is zero or near zero (e.g., at a stop light) or when the torque required from engine 14A is zero or near zero (e.g., when vehicle 10A is coasting down an incline). Regardless of the cause for the engine stop command, controller 26A sends one or more control signals to engine 14A and/or components associated with engine 14A to terminate engine operation. For example, the fuel injection system (not shown) associated with engine 14A may be caused to cease injecting fuel into the engine cylinders.

When engine 14A operation is terminated at step 42A, engine 14A will "coast" briefly to a zero or near zero torque condition. In step 44A of process 40A, controller 26A monitors engine 14A and MG 18A (which may also be in motion just before the engine stop command) as engine 14A and MG 18A are allowed to reduce their respective torque outputs to zero or near zero. When both engine 14A and MG 18A are in a zero or near zero torque condition, controller 26 opens second clutch 19. This decouples MG 18A from final drive 24A to permit MG 18A to be used for energy recovery from engine 14A as described below without directly affecting the speed of vehicle 10A. At this point in process 40A, engine 14A may still be slowing to a zero or near zero speed. In other words, the internally moving components of engine 14A (e.g., the pistons, crankshaft, etc.) will continue to move for some period of time and, if the stop condition is sufficiently long, will come to a stop as a result of friction and other forces.

After second clutch 19 is opened (step 46), at step 48A, MG 18A is used in a generator mode to load engine 14A and recover the engine's kinetic energy. This additional load on engine 14A causes engine 14A to reach a zero or near-zero speed condition more quickly than if engine 14A were simply allowed to coast to a stop. The energy recovered by MG 18A from engine 14A is provided to energy storage system 22A and stored for future use.

At step 50A of process 40A, after engine 14A and MG 18A have slowed to a zero speed or near zero speed condition, controller 26A causes clutch 16A to open. This decouples engine 14A and MG 18A and permits MG 18A to reengage transmission 20A. Once decoupled from engine 14A at step 50A, MG 18A is commanded at step 52A by controller 26A to accelerate back up to the target speed. At step 54, controller 26 causes second clutch 19 to close. After this, MG 18A is used to propel vehicle 10A in an all-electric mode as indicated by step 56A. MG 18A will continue to be used to propel vehicle 10A until additional torque is required from engine 14A to meet the operator's demands. When additional torque is required, controller 26A causes engine 14A to be restarted in any of a variety of ways known to those skilled in the art.

As may be apparent from the foregoing, the benefits of the methodology described herein may be dependent in part upon the torque capability of MG 18 for at least two reasons. First, since a larger MG 18 accomplishes step 48 more quickly (i.e., brings the engine speed to zero or near zero more quickly), less energy is lost to engine pumping and friction. Second, also as a result of step 48 being performed more quickly, a larger MG 18 permits the entire process of shutting the engine down and enabling the MG to power the vehicle can be accomplished more quickly. This reduces the torque interrupt time associated with an engine shutdown and results in less impact on vehicle drivability.

Additionally, it should be understood that by reducing the energy lost during engine shutdowns, the present methodology reduces the penalty associated with engine start/stop systems. Consequently, controller 26 may initiate engine shutdowns more frequently thereby improving energy efficiency and decreasing emissions.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 1120), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include, only those elements but may include other elements not expressly listed or inherent to such process, method, article, or apparatus.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only,

What is claimed is:

1. A hybrid powertrain system, comprising:
    an engine;
    at least one motor/generator ("MG");
    a clutch coupled to the engine and the at least one MG;
    a transmission coupled to the at least one MG;
    an energy storage system connected to the at least one MG; and
    a controller operatively coupled to the engine, the at least one MG, the clutch, the transmission and the energy storage system, the controller including a processor and a memory including instructions that when executed by the processor, cause the controller to:
        initiate an engine stop,
        allow engine torque and torque associated with the at least one MG to reduce to zero or near zero,
        shift the transmission to a neutral gear,
        cause the at least one MG to operate in a generator mode, thereby loading the engine through the clutch to recover kinetic energy from the engine,
        disengage the clutch to decouple the at least one MG from the engine,
        increase a speed of the at least one MG to a target speed, and
        shift the transmission into gear in response to the at least one MG reaching the target speed.

2. The hybrid powertrain system of claim 1, wherein execution of the instructions by the processor further causes the controller to propel a vehicle using power from the at least one MG after shifting the transmission into gear.

3. The hybrid powertrain system of claim 2, wherein the vehicle is a full hybrid vehicle.

4. The hybrid powertrain system of claim 2, wherein the engine is an internal combustion engine.

5. The hybrid powertrain system of claim 2, wherein initiating an engine stop includes determining based upon input from at least one sensor that power from the engine is not required to propel the vehicle.

6. The hybrid powertrain system of claim 2, wherein shifting the transmission to a neutral gear decouples the at least one MG from a final drive of the vehicle.

7. The hybrid powertrain system of claim 1, wherein execution of the instructions by the processor further causes the controller to control the at least one MG to store energy recovered from the engine by the at least one MG in the energy storage system.

8. The hybrid powertrain system of claim 1, wherein the energy storage system includes a plurality of batteries.

9. The hybrid powertrain system of claim 1, wherein a load applied on the engine that results from operating the at least one MG in the generator mode causes the engine to reach a zero or near-zero speed condition more quickly than when the engine is allowed to coast to the zero or near-zero speed condition.

10. The hybrid powertrain system of claim 1, wherein execution of the instructions by the processor further causes the controller to, responsive to determining that an additional torque is required, restart the engine to provide the additional torque.

11. A method for recovering energy from an engine in a hybrid powertrain including at least one motor/generator ("MG"), comprising:
    initiating an engine stop;
    allowing engine torque and torque associated with the at least one MG to reduce to zero or near zero;
    shifting a transmission coupled to the at least one MG to a neutral gear;
    causing the at least one MG to operate in a generator mode, thereby loading the engine through a clutch to recover kinetic energy from the engine;
    disengaging the clutch to decouple the at least one MG from the engine;
    increasing a speed of the at least one MG to a target speed; and
    shifting the transmission into gear in response to the at least one MG reaching the target speed.

12. The method of claim 11, further comprising propelling a vehicle using power from the at least one MG after shifting the transmission into gear.

13. The method of claim 12, wherein the vehicle is a full hybrid vehicle.

14. The method of claim 12, wherein the engine is an internal combustion engine.

15. The method of claim 12, wherein initiating an engine stop includes determining based upon input from at least one sensor that power from the engine is not required to propel the vehicle.

16. The method of claim 12, wherein shifting a transmission to a neutral gear decouples the at least one MG from a final drive of the vehicle.

17. The method of claim 11, further comprising storing energy recovered from the engine by the at least one MG in an energy storage system connected to the at least one MG.

18. The method of claim 17, wherein the energy storage system includes a plurality of batteries.

19. A hybrid powertrain system, comprising:
    an engine;
    at least one motor/generator ("MG");
    a first clutch coupled to the engine and the at least one MG;
    a second clutch coupled between the at least one MG and a final drive;
    an energy storage system connected to the at least one MG; and
    a controller operatively coupled to the engine, the at least one MG, the first clutch, the second clutch and the energy storage system, the controller including a processor and a memory including instructions that when executed by the processor, cause the controller to:
        initiate an engine stop,
        allow engine torque and torque associated with the at least one MG to reduce to zero or near zero,
        open the second clutch,
        cause the at least one MG to operate in a generator mode, thereby loading the engine through the first clutch to recover kinetic energy from the engine,
        disengage the first clutch to decouple the at least one MG from the engine,
        increase a speed of the at least one MG to a target speed, and
        close the second clutch in response to the at least one MG reaching the target speed.

20. The hybrid powertrain system of claim 19, further comprising a transmission coupled to the at least one MG, wherein execution of the instructions by the processor further causes the controller to engage the at least one MG with the transmission in response to the at least one MG being decoupled from the engine.

* * * * *